United States Patent [19]

Pinto

[11] Patent Number: 4,828,282
[45] Date of Patent: May 9, 1989

[54] CADDY FOR TRANSPORTING A LAWN MOWER OPERATOR

[76] Inventor: Manuel Pinto, 33 Hopper St., Pleasantville, N.Y. 10570

[21] Appl. No.: 173,801

[22] Filed: Mar. 28, 1988

[51] Int. Cl.⁴ .............................................. B62D 63/06
[52] U.S. Cl. .................................................. 280/32.7
[58] Field of Search ............................ 280/32.7, 32.5; 172/433; 180/12, 13, 19.1, 19.2

[56] References Cited

U.S. PATENT DOCUMENTS

| | | | |
|---|---|---|---|
| 2,354,576 | 7/1944 | Clark | 180/19.1 |
| 3,336,042 | 8/1967 | Southall | 280/32.7 X |
| 3,485,314 | 12/1969 | Herr | 280/32.7 X |
| 3,891,043 | 6/1975 | Valdex | 280/32.7 X |

Primary Examiner—John A. Pekar
Attorney, Agent, or Firm—John F. Ohlandt

[57] ABSTRACT

A caddy that is hitchable to a self-propelled power mower which comprises a pair of wheels and an axle for coupling the wheels including a main axle member which is positioned below the wheel center, an operator platform is mounted on the main axle such that the operator is positioned over the axle. The platform is located such that wheel centers are located in a vertical plane which substantially laterally bisects the platform so that the shifting rearwardly of the operator's weight cause concentration of the load on the wheels. A towbar is fixed to the axle and removably hitched to the mower. The wheel centers are located rearwardly from the main axle so that when the operator is normally positioned on the caddy a torque about the wheels centers is created that causes the towbar to apply a force at the mower.

5 Claims, 2 Drawing Sheets

CADDY FOR TRANSPORTING A LAWN MOWER OPERATOR

TECHNICAL FIELD

This invention concerns a caddy that is hitchable to a self-propelled, power lawn mower for transporting the operator during use, the caddy including a pair of wheels coupled by an axle member positioned below the wheel centers, an operator riding platform substantially centered over the axle, and a hitch bar for connecting the caddy to the mower.

BACKGROUND INFORMATION

In commercial as well as non-commercial grass cutting, in order to increase productivity, it is necessary to reduce the physical stress placed upon the mower operator. The less the physical demands of the task, the greater the area the mower operator can cover in a given time. Accordingly, lawn mowers have evolved from the early, rather strenuous to operate push type to the more relaxed, riding units of today.

However, the riding mowers commonly found today have drawbacks, particularly in commercial settings. They are typically large, mechanically complex and expensive.

Because of their size, they are difficult to transport and store, and are restricted in confined or highly contoured mowing areas. Their mechanical complexity tends to make them less reliable and more costly to repair and maintain. And, their high price can make them prohibitively expensive, particularly in commercial applications.

However, in the past, compromises between the cost and complexity of riding mowers and the physical demands of manual or power mowers have been proposed. Particularly, in U.S. Pat. No. 2,919,756 issued to E. A. Knipe January 1960, and U.S. Pat. No. 2,677,224 issued to H. J. Stegeman May 1954, it is suggested to couple a "sulky", upon which an operator can sit, to a self-propelled, power mower. This approach has the advantage of reducing the purchase price and complexity of the mower as compared with a riding mower, while relieving the operator of the burden of having to follow the mower around on foot during cutting as where a self-propelled mower were used alone.

But, as seen nn both the Knipe and Stegeman patents, the apparatus proposed still require relatively complicated mechanical arrangements to seat the operator, couple the sulky to the mower and provide drive power to the sulky wheels.

SUMMARY OF INVENTION

It is therefore an object of this invention to provide a caddy that is hitchable to a self-propelled lawn mower for transporting the mower operator during use.

It is a further object of this invention to provide a caddy of simple design that is inexpensive to construct.

It is a yet further object of this invention to provide a caddy that is designed to be stable so as to minimize the chance of overturning or throwing the operator during use.

It is still another object of this invention to provide a caddy that is adjustable so that variations in the size and reach of the operator can be compensated for.

It is, again, another object of this invention to provide a caddy that is capable of being readily configured so that it may be conveniently stored or transported.

Briefly, the caddy in accordance with this invention features a pair of wheel assemblies which are coupled to an axle assembly having a main fixed axle member, the main axle member being located below the centers of the wheel assemblies and proximate the ground to provide a low center of gravity and attendant stability.

Additionally, the caddy features an operator riding platform, preferably in the form of two shoe plates mounted substantially centering on the main axle member such that the operator's weight is distributed along the axle member when he stands upon the plates.

Additionally, the caddy includes a towbar and coupling for releasably connecting the caddy to a self-propelled mower. The towbar is connected to the axle assembly approximately mid way between the wheel assemblies and extends orthoganally therefrom.

In preferred form, the towbar is adjustably mounted to the caddy axle so that the distance between the caddy and the mower, specifically, the mower handlebars, can be adjusted to compensate for variations in the reach of different operators.

Also, in preferred form the towbar is made collapsible so that the caddy can be conveniently stored or transported.

The foregoing, and other objects, features and advantages of the invention will become apparent from the following more detailed description of a preferred embodiment of the invention as illustrated in the accompanying figures.

DETAILED DESCRIPTION

Figures 1, 2:
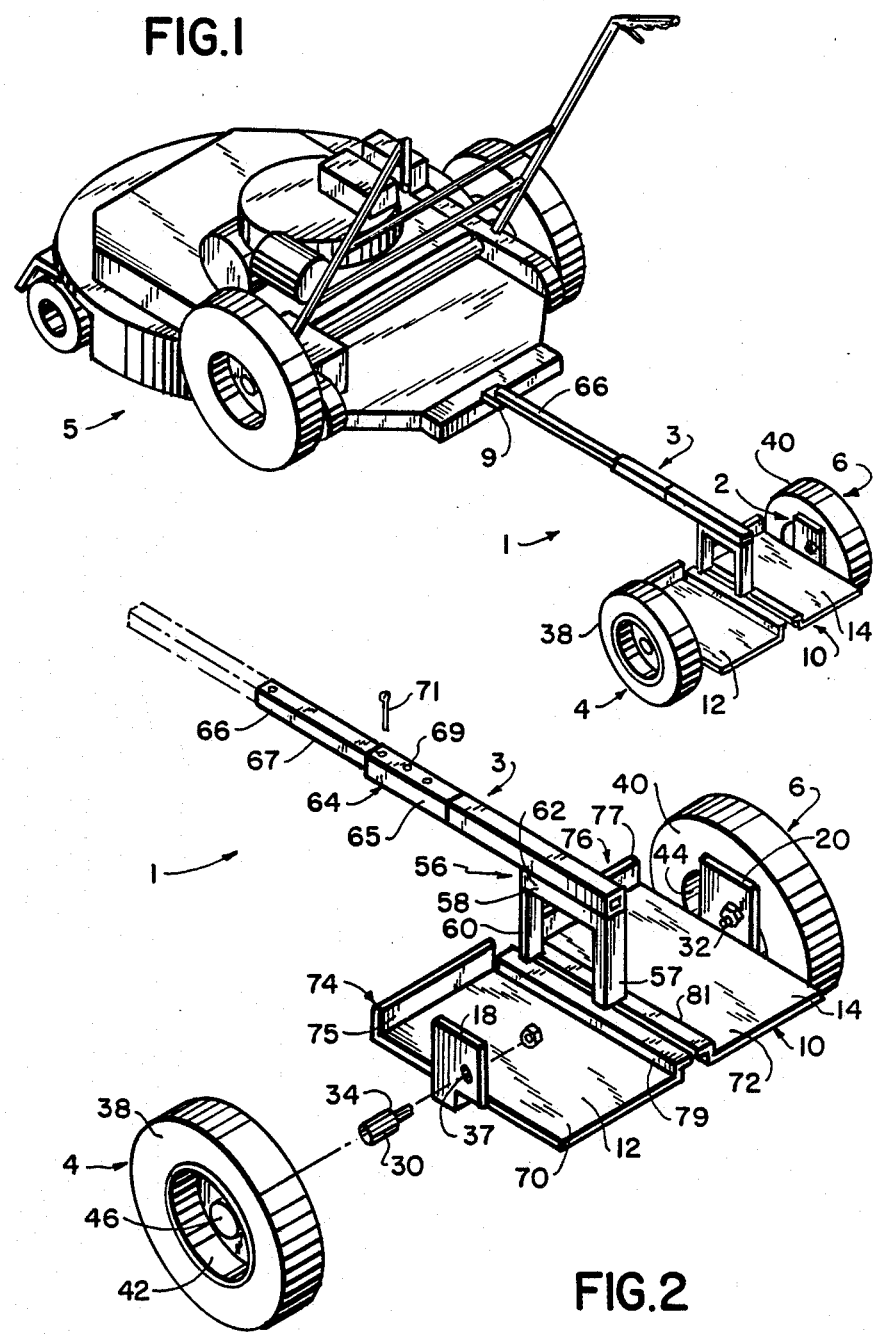
FIG. 1 is a perspective view of a mower to which a caddy in accordance with this invention is coupled.
FIG. 2 is a partially exploded perspective view of the caddy in accordance with this invention.
Figure 3:
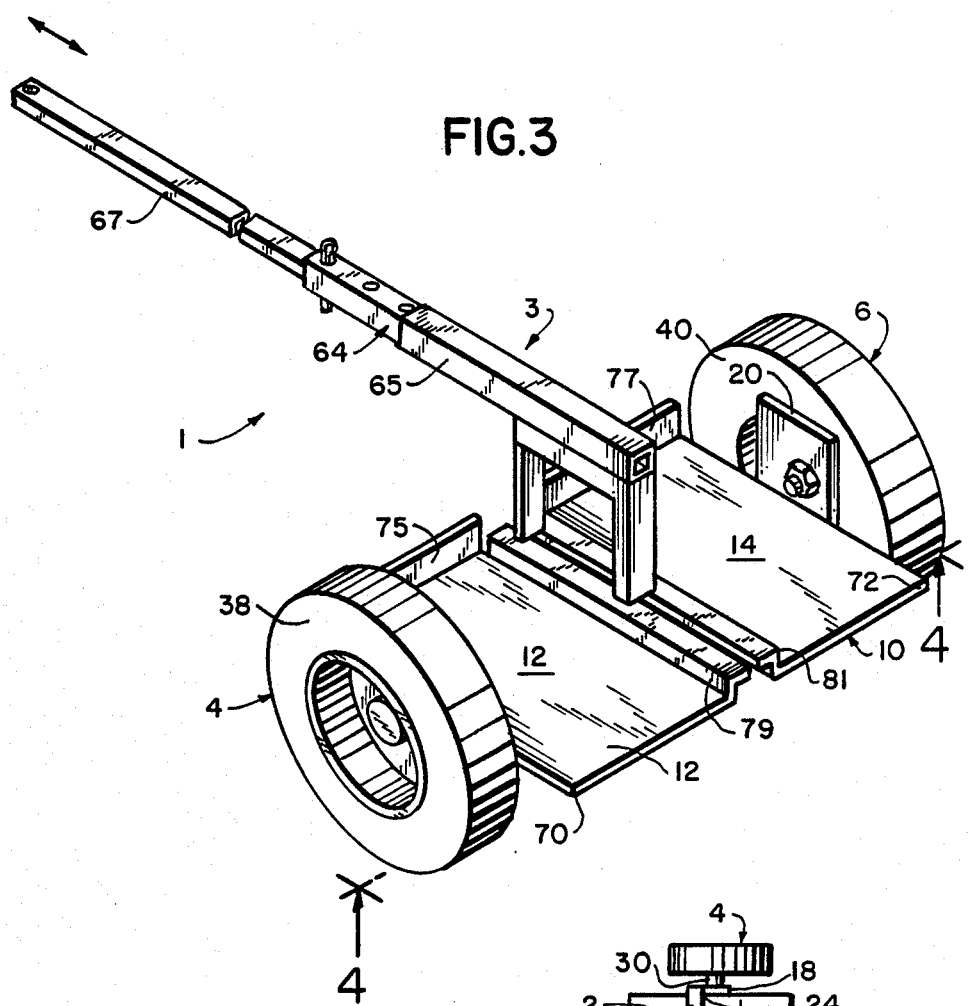
FIG. 3 is a perspective view of the caddy in accordance with this invention.

The caddy in accordance with this invention is shown in FIGS. 1 to 5. As shown in FIG. 1, caddy 1 has a simplified and easily assembled construction to facilitate low cost and reliability. More particularly, caddy 1 includes an axle assembly 2 (best seen in FIG. 4) which couples a pair of wheel assemblies 4 and 6, respectively for mobility. Additionally, caddy 1 includes a towbar assembly 3 for releasably hitching caddy 1 to a self-propelled power mower 5. Still further, caddy 1 includes an operator riding platform assembly 10 mounted upon axle assembly 2, and arranged to receive the mower operator. As shown, in preferred form, platform assembly 10 includes a pair of shoe plates 12 and 14 positioned on axle assembly 2 to receive the operator's weight.

Figure 4:
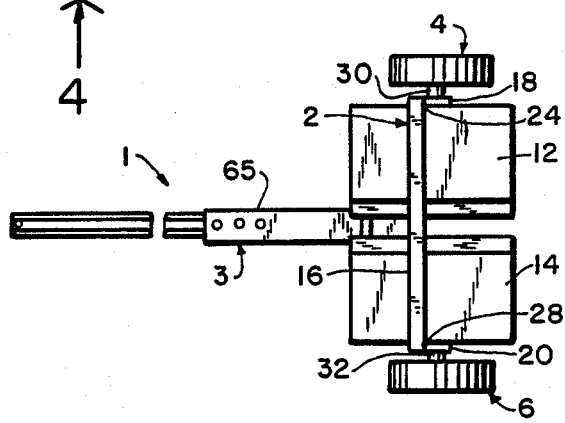
FIG. 4 is a plan view of the underside of the caddy in accordance with this invention.

As best seen in FIG. 4, in accordance with the invention, the simple, low-cost construction of caddy 1 is facilitated by providing axle assembly 2 as the principal and sole element from which the other caddy subassemblies depend. As shown, axle assembly 2 includes a fixed main axle member 16, which in preferred form is straight lined, that extends between wheel assemblies 4 and 6.

Figure 5:
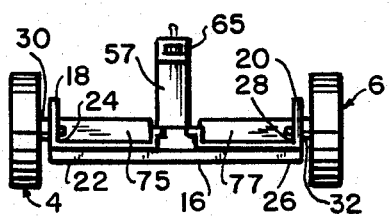
FIG. 5 is an elevation view of the caddy in accordance with this invention from the rear.

Axle assembly 2 also includes a pair of wheel mounting plates 18 and 20. As shown in FIG. 5, main axle member 16 is affixed at a first end 22 to the lower inside face of plate 18 at anchor point 24. The affixing may be accomplished in any convenient fashion; e.g., by welding. In a like manner, second end 26 of axle member 16 is affixed at the lower inside face of plate 20 at anchor point 28. Again, affixing may be accomplished in any convenient fashion.

Continuing, axle assembly is seen to also include a pair of spindles 30, 32 respectively affixed to mounting plates 18 and 20 for receiving wheel assemblies 4 and 6. In accordance with the invention and as best seen in FIG. 4, spindle 30 and 32 are mounted on the associated plates 18, 20 above and rearwardly of anchor points 24 and 28 at which axle member 16 is affixed to plte 18 and 20, the front of caddy being defined by towbar assembly 3.

Spindles 30 and 32 are mounted above axle member 16 in order to establish the caddy's center of gravity close to the ground. By providing a low center of gravity the stability of caddy 1 is improved, it being more difficult for the caddy to overturn or throw the operator; as for example in turns or by riding over obstructions. As will be appreciated, this approach improves the safety aspect of the caddy. Accordingly, and as will also be appreciated, it is desirable to position to position axle 16 as close to the ground as possible, while still maintaining adequate ground clearance to assure mobility. In preferred form, axle member 16 is positioned approximately 3 to 6 inches from the ground.

Still further, by locating spindles 30, 32 rearwardly of anchor points 24 and 28, a torque is produced about the spindles when the operator stands on the caddy. This torque tends to cause the hitch to apply a force against the mower, thereby, effecting a positive, retained engagement with the mower.

Additionally, the torque causes the weight of the operator to be borne at wheel assemblies 4 and 6 and hitch point 9 to mower 5. This has the effect of reducing the loading on the wheel assemblies and their bearings.

However, if desired, a shifting rearwardly of the operator's weight can cause the load to be concentrated on the wheel assemblies. This advantageous result is due to the precise location of the platform 10 as seen in the drawing. Thus, the platform is so located that the wheel assembly centers are located in a vertical plane which substantially laterally bisects said platform.

Since the mounting of wheel assemblies 4 and 6 are the same, they may both be understood with reference to wheel assembly 4. With reference to FIG. 2, as shown, spindle 30 of wheel assembly 4 is fixed at end 34 to anchor point 37, of plate 18. The spindle may be affixed in any convenient fashion, and as shown, is removably mounted by providing end 34 with a shoulder and threads so the ends can be received in a hole 37 provided in the plate 18 and extend to the plate's inner face where the spindle can be secured by a nut. As will be appreciated, removable mounting of the spindles provide for simple and quick removal of the wheel assemblies.

As seen in FIG. 2, wheel assemblies 4 and 6 are commonly used on lawn mowing equipment. They include respectively a tire, 38, 40, each of which is mounted on a rim 42, 44. Rims 42, 44 are each provided with a conventional bearinged hub 46, 48 which is received at spindles 30, 32. Rims 42, 44 may be secured to the spindles in a conventional manner; e.g. by locknut and cotter pin or the equivalent.

In preferred form, tires 38, 40 are pneumatic in order to cushion shock from irregular terrain over which the caddy is towed. Accordingly, the pneumatic tires compensate for inexpensive and simple, but rough riding, solid mount axle assembly 2.

Continuing with reference to FIG. 2, caddy 1 includes a towbar assembly 3 for hitching the caddy to mower 5. Towbar assembly 3 includes a mounting member 56 located approximately midway along the length of axle 16 between wheel assemblies 4 and 6. Mounting member 56 includes a post 57 extending substantially vertically from axle member 16 to a predetermined height at which a support element 58 is provided projecting forward of the caddy from post 56. A further reinforcing strut 60 depends from support element 58 back to the caddy.

In this arrangement, the upper face 62 of support element 58 of post 56 forms a platform for receiving a towbar 64 which projects forward of the caddy where it can be conveniently connected to mower 5. The connection to mower 5 at point 9 can be readily accomplished with a dowel and socket arrangement at the towbar end 66 which connects to mower 5.

As will be appreciated, the inverted "U" shaped form of mounting member 56 forms a convenient handle for carrying the caddy.

In preferred form, towbar 64 is made to be adjustable in its extension from the bar support element 58 so that the distance from the caddy to the mower can be adjusted to accommodate differences in reach of various operators. As will be appreciated, this can be accomplished by providing a series of positioning holes along the length of bar 64 and a companion pin and receiving hole in support element 58, or other equivalent means.

As a preferred way of achieving adjustability, and to permit convenient storage and transport of the caddy, bar 64 may be arranged, as seen in the figures, in telescoping sections 65 and 67 that collapse to retract towbar 64. Again, a pin and hole arrangement 69, 71 may be conveniently provided.

Finally, caddy 1 includes an operator riding platform assembly 10 having a pair of shoe plates 12 and 14. As shown in FIG. 2, plates 12 and 14 are substantially the same and include generally rectangular plate elements 70, 72, each having upwardly extending guard assemblies 74, 76 positioned at the perimeter of the plates. At the front of each plate, the guard assemblies respectively include rails 75, 77. At the inside of the plate, the assemblies include rails 79, 81. The rear portion of the plates is not provided with such guard rails. This arrangement allows the operator's feet to be readily received at the plates such that guard assemblies 74, 76 will prevent his feet from slipping from the plates during mowing.

As best seen in FIG. 4, the shoes are mounted on axle member 16 so that the center line of the operator is positioned substantially perpendicular to axle member 16. This enables the axle member 16 to readily support shoe plates 12 and 14 and the operator standing thereon. As will be appreciated, shoe plates 12, 14 may be made of metal, and mounted to axle member 16 in any convenient manner; e.g., by welding.

In use, the lawn mower operator simply adjusts the extension of towbar 64 so that his arms conveniently reach the mower handle bars, hitches the towbar to the mower, stands on shoe plates 12, 14, and proceeds to drive the mower away with the caddy and operator following behind.

While this invention has been described in its preferred form, it will be appreciated by those skilled in the art that changes may be made in the form, construction and arrangement of its elements without departing from its spirit or scope.

What I claim is:

1. A caddy that is hitchable to a self-propelled power mower for transporting an operator, the caddy comprising:
   a. a pair of wheel assemblies;
   b. an axle assembly for coupling the wheel assemblies, the axle assembly including a main axle member which is positioned below the centers of the wheel assemblies;
   c. operator riding platform mounted on the main axle member at which the operator may be received such that the operator is positioned over the axle member; the platform being located such that said wheel assembly centers are located in a vertical plane which substantially laterally bisects said platform, whereby the shifting rearwardly of the operator's weight causes concentration of the load on the wheel assemblies;
   d. towbar assembly affixed to the axle assembly and removably hitchable to the mower so that the caddy and operator may be transported when the mower is driven;
   e. the wheel assembly centers being located rearwardly a predetermined distance from the main axle member such that when the operator is normally positioned on the caddy a torque about the wheel assembly centers is created that causes the towbar assembly to apply a force at the mower.

2. The caddy of claim 1 wherein the operator riding platform includes two shoe plates mounted on the main axle member substantially centered thereon so that the operator straddles the towbar assembly which is attached centrally of the main axle member.

3. The caddy of claim 2 wherein the axle assembly is rigidly mounted to the wheel assemblies.

4. The caddy of claim 3 wherein the wheel assemblies include pneumatic tires.

5. The caddy of claim 1, in which the length of the towbar assembly is adjustable.

* * * * *